United States Patent
Tosa et al.

(10) Patent No.: US 6,844,284 B2
(45) Date of Patent: Jan. 18, 2005

(54) DIELECTRIC PORCELAIN COMPOSITION

(75) Inventors: Akifumi Tosa, Konan (JP); Jun Otsuka, Konan (JP); Manabu Sato, Nagoya (JP)

(73) Assignee: NGK Spark Plug Co., Ltd., Aichi (JP)

( * ) Notice: Subject to any disclaimer, the term of this patent is extended or adjusted under 35 U.S.C. 154(b) by 40 days.

(21) Appl. No.: 10/291,647

(22) Filed: Nov. 12, 2002

(65) Prior Publication Data

US 2003/0119657 A1 Jun. 26, 2003

(30) Foreign Application Priority Data

Nov. 12, 2001 (JP) .................................. P.2001-346448

(51) Int. Cl.$^7$ ............................................. C04B 35/468
(52) U.S. Cl. ..................................... 501/139; 333/202
(58) Field of Search ................. 501/137, 139; 333/202

(56) References Cited

U.S. PATENT DOCUMENTS 6,319,871 B1 * 11/2001 Sato et al. .................. 501/139
6,331,499 B1 * 12/2001 Shimada et al. ............ 501/139
6,380,117 B2 * 4/2002 Sato et al. .................. 501/139

FOREIGN PATENT DOCUMENTS

| EP | 0 983 979 A1 | 3/2000 |
| EP | 1092694 | * 4/2001 |
| JP | 59-51091 | 12/1984 |
| JP | 4-104949 A | 4/1992 |
| JP | 6-309926 | 4/1994 |
| JP | 8-25794 | 3/1996 |
| JP | 0 966 002 A1 | 6/1999 |
| JP | 2000-7429 | 1/2000 |

OTHER PUBLICATIONS

European Search Report dated Feb. 6, 2004.

* cited by examiner

*Primary Examiner*—Karl Group
(74) *Attorney, Agent, or Firm*—Sughrue, Mion, PLLC

(57) ABSTRACT

A dielectric porcelain composition comprising Ba, Nd, Pr, Bi, Ti and at least one of Na and K and satisfying a condition that when the composition is expressed by composition formula: $BaO$—$aNdO_{3/2}$—$bPrO_{11/6}$—$cBiO_{3/2}$—$dTiO_2$—$eAO_{1/2}$, wherein A is at least one of Na and K, and a, b, c, d and e represent a molar ratio, a, b, c, d and e are in respective ranges of $1.5 \leq a \leq 2.6$, $0.02 \leq b \leq 1.00$, $0.2 \leq c \leq 0.6$, $4.5 \leq d \leq 5.5$ and $0.02 \leq e \leq 0.30$.

8 Claims, 2 Drawing Sheets

US 6,844,284 B2

DIELECTRIC PORCELAIN COMPOSITION

FIELD OF THE INVENTION

The present invention relates to a dielectric porcelain composition, more specifically, the present invention relates to a dielectric porcelain composition having a relatively high dielectric constant (hereinafter sometimes simply referred to as "$\epsilon_r$"), a large coefficient of unloaded quality (hereinafter sometimes simply referred to as "$Q_u$") and a small absolute value of the temperature coefficient of resonance frequency (hereinafter sometimes simply referred to as "$\tau_f$").

The dielectric porcelain composition of the present invention is widely used for a resonator used in the high frequency region, a filter, a multilayer circuit board, an impedance matching member of various microwave circuits, and the like.

BACKGROUND OF THE INVENTION

With recent rapid progress of various communication systems using an electromagnetic wave in the microwave region, such as car telephone, cellular phone and satellite broadcasting, a large number of dielectric materials have been developed. This dielectric material is demanded to simultaneously satisfy three characteristic features, that is, (1) the dielectric constant ($\epsilon_r$) is high, (2) the coefficient of unloaded quality ($Q_u$) is large and (3) the absolute value of temperature coefficient of resonance frequency ($\tau_f$) is small.

As for the dielectric material having a relatively high dielectric constant, $BaO-RE_2O_3-TiO_2$ materials (RE: rear earth element) and the like are known at present (see, JP-A-6-309926 (the term "JP-A" as used herein means an "unexamined published Japanese patent application" and JP-A-2000-7429) and being used for resonator, filter and the like.

SUMMARY OF THE INVENTION

In recent years, accompanying the requirement for downsizing of various communication devices, the dielectric material is required to have higher $\epsilon_r$ and $Q_u$ while keeping small the absolute value of $\tau_f$. The $BaO-RE_2O_3-TiO_2$ materials used for these uses have $\epsilon_r$ of approximately from 70 to 80 and if the $\epsilon_r$ is elevated, bad $\tau_f$ and reduced $Q_u$ are liable to result. Therefore, a dielectric porcelain composition having not only a high $\epsilon_r$ value but also a small absolute value of $\tau_f$ and a large $Q_u$ value is demanded.

The present invention has been made to solve the above-described problem and the object of the present invention is to provide a dielectric porcelain composition having excellent balance in the dielectric characteristics with a high $\epsilon_r$ value, a large $Q_u$ value and a small absolute value of $\tau_f$.

The dielectric porcelain composition of the present invention is characterized by comprising Ba, Nd, Pr, Bi, Ti and at least one of Na and K and satisfying the condition that when the composition is expressed by the compositional formula $[BaO-aNdO_{3/2}-bPrO_{11/6}-cBiO_{3/2}-dTiO_2-eAO_{1/2}]$ (wherein A is Na and/or K and a, b, c, d and e represent a molar ratio), a, b, c, d and e are in respective ranges of $1.5 \leq a \leq 2.6$, $0.02 \leq b \leq 1.00$, $0.2 \leq c \leq 0.6$, $4.5 \leq d \leq 5.5$ and $0.02 \leq e \leq 0.30$.

These a, c, d and e may also be $1.5 \leq a \leq 2.4$, $0.3 \leq c \leq 0.5$, $4.6 \leq d \leq 5.5$ and $0.02 \leq e \leq 0.20$.

Another dielectric porcelain composition of the present invention is characterized in that the composition is obtained by mixing metal oxide powders Ba, Nd, Pr, Bi, Ti and at least one of Na and K, and/or metal compounds capable of converting into said respective metal oxides after heating, to satisfy the condition that when the composition is expressed by the compositional formula $[BaO-aNdO_{3/2}-bPrO_{11/6}-cBiO_{3/2}-dTiO_2-eAO_{1/2}]$ (wherein A is Na and/or K), the molar ratio of respective metal elements in terms of oxide is $1.5 \leq a \leq 2.6$, $0.02 \leq b \leq 1.00$, $0.2 \leq c \leq 0.6$, $4.5 \leq d \leq 5.5$ and $0.02 \leq e \leq 0.30$, and burning the mixture.

These a, c, e and e may also be $1.5 \leq a \leq 2.4$, $0.3 \leq c \leq 0.5$, $4.6 \leq d \leq 5.5$ and $0.02 \leq e \leq 0.20$.

DETAILED DESCRIPTION OF THE INVENTION

Figure 1:
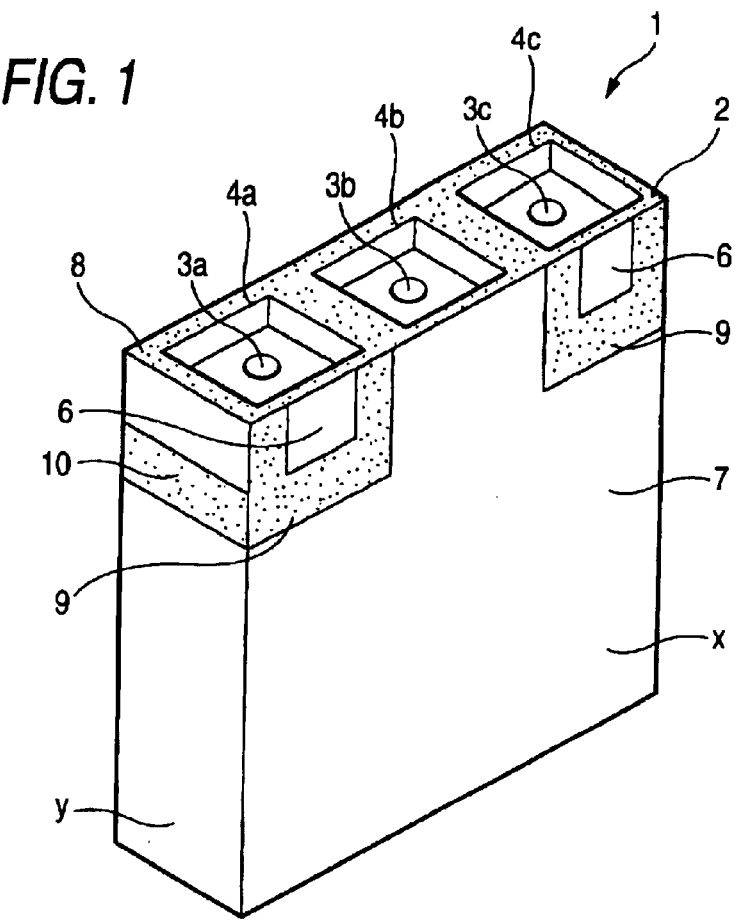
FIG. 1 is a perspective view according to one embodiment of the dielectric filter 1 of the present invention.

The present invention is described in detail below.

The dielectric porcelain composition of the present invention comprises Ba, Nd, Pr, Bi, Ti and at least one of Na and K. When the dielectric porcelain composition of the present invention is expressed by the compositional formula $[BaO-aNdO_{3/2}-bPrO_{11/6}-cBiO_{3/2}-dTiO_2-eAO_{1/2}]$ (wherein A is Na and/or R and a, b, c, d and e represent a molar ratio), a, b, c, d and e are in respective ranges of $1.5 \leq a \leq 2.6$, $0.02 \leq b \leq 1.00$, $0.2 \leq c \leq 0.6$, $4.5 \leq d \leq 5.5$ and $0.025 \leq e \leq 0.30$. "A" is preferably K.

If "a" is less than 1.5 or exceeds 2.6, the $Q_u$ value disadvantageously decreases. If "b" is less than 0.02, the effectiveness in the improvement of $\epsilon_r$ by the addition of Pr cannot be confirmed, whereas if it exceeds 1.00, the $Q_u$ value disadvantageously decreases. If "c" is less than 0.2, the dielectric constant $\epsilon_r$ decreases and this is not preferred, whereas if it exceeds 0.6, the $Q_u$ value disadvantageously decreases. If "d" is less than 4.5, sintering failure is caused and the $Q_u$ value and the dielectric constant $\epsilon_r$ disadvantageously decrease, whereas if it exceeds 5.5, the absolute value of $\tau_f$ becomes large and this is not preferred. If "e" is less than 0.02, the improvement of $Q_u$ value is not attained, whereas if it exceeds 0.30, the $Q_u$ value disadvantageously decreases.

These a, c, d and e are preferably $1.5 \leq a \leq 2.4$, $0.3 \leq c \leq 0.5$, $4.6 \leq d \leq 5.5$ and $0.02 \leq e \leq 0.20$. Furthermore, those a, b, c, d and e are (1) preferably $1.8 \leq a \leq 2.4$, $0.03 \leq b \leq 0.6$, $0.3 \leq c \leq 0.5$, $4.6 \leq d \leq 5.4$ and $0.02 \leq e \leq 0.20$, (2) more preferably $1.9 \leq a \leq 2.4$, $0.03 \leq b \leq 0.20$, $0.3 \leq c \leq 0.5$, $4.6 \leq d \leq 5.4$ and $0.05 \leq e \leq 0.20$, (3) still more preferably $2.0 \leq a \leq 2.2$, $0.03 \leq b \leq 0.2$, $0.3 \leq c \leq 0.4$, $4.6 \leq d \leq 5.3$ and $0.03 \leq e \leq 0.20$.

The method for producing the above-described dielectric porcelain composition is described below.

As raw material powders, at least one of Ba oxide powder and Ba compound powder (hereinafter referred to as "Ba oxide powder and the like"), at least one of Nd oxide powder and Nd compound powder (hereinafter referred to as "Nd oxide powder and the like"), at least one of Pr oxide powder and Pr compound powder (hereinafter referred to as "Pr oxide powder and the like"), at least one of Bi oxide powder and Bi compound powder (hereinafter referred to as "Bi oxide powder and the like"), at least one of Ti oxide powder and Ti compound powder (hereinafter referred to as "Ti oxide powder and the like") and at least one of Na oxide powder and Na compound powder (hereinafter referred to as "Na oxide powder and the like") and/or at least one of K oxide powder and K compound powder (hereinafter referred to as "K oxide powder and the like") are used. Hereinafter, these Ba, Nd, Pr, Bi, Ti and Na and/or K oxide powders and the like are referred to as "metal oxide powder and the like". The Na oxide powder and the like and the K oxide powder and the like both may be used in combination or only one of these powders may be used. It is preferred to use only K oxide powder and the like.

The metal compound powders each may be sufficient if it is a compound powder which becomes an oxide when heated. Examples thereof include carbonate powder, hydrogen-carbonate powder, hydroxide powder and nitrate powder of each metal. These oxide powders of each metal may be used individually or in combination of two or more thereof.

The metal oxide powders are mixed such that when the compound is expressed by $BaO-aNdO_{3/2}-bPrO_{11/6}-cBiO_{3/2}-dTiO_2-eAO_{1/2}$ (wherein A is Na and/or K), the molar ratio of metals each calculated in terms of an oxide is in the range of $1.5 \leq a \leq 2.6$, $0.02 \leq b \leq 1.00$, $0.2 \leq c \leq 0.6$, $4.5 \leq d \leq 5.5$ and $0.02 \leq e \leq 0.30$. The reason why the molar ratio is specified as such is the same as the reason described above.

Thereafter, this mixture is sintered, whereby the dielectric porcelain composition of the present invention is obtained. At this time, the mixture is usually calcined at 900 to 1,400° C., preferably from 900 to 1,200° C., for 1 to 20 hours, preferably from 2 to 10 hours, the calcined powder after pulverization is molded, and the molded article is sintered at 1,200 to 1,500° C. for 1 to 10 hours in a predetermined atmosphere. However, the dielectric porcelain composition can also be obtained without using the calcined powder but by mixing the raw material powders, directly molding the mixture and sintering the molded article under the above described conditions.

The shape, size and the like of the molded article are not particularly limited and the molding method is also not particularly limited. Furthermore, the atmosphere in the calcination and sintering is not particularly limited and an air atmosphere is usually used but an inert atmosphere, a reducing atmosphere and the like may also be used.

The dielectric porcelain composition produced as such can have a dielectric constant $\epsilon_r$ of 90 or more, preferably 91 or more. The product $(Q_u \times f_o)$ of unloaded quality coefficient and resonance frequency can be 3,800 GHz or more, preferably 4,000 GHz or more, more preferably 4,200 GHz, still more preferably 4,400 GHz or more. Furthermore, the absolute value of temperature coefficient $\tau_f$ of resonance frequency can be 18 ppm/° C. or less, preferably 15 ppm/° C. or less, more preferably 12 ppm/° C. or less, still more preferably 10 ppm/° C. or less, particularly preferably 8 ppm/° C. or less. These performance values can be variously combined.

When a, b, c, d and e each is in the following range, the dielectric porcelain composition can have the following performances.

(1) When $1.5 \leq a \leq 2.6$, $0.02 \leq b \leq 1.00$, $0.2 \leq c \leq 0.6$, $4.5 \leq d \leq 5.5$ and $0.02 \leq e \leq 0.30$, the dielectric constant $\epsilon_r$ is 90 or more (particularly from 91 to 97), the product of unloaded quality coefficient and resonance frequency $Q_u \times f_o$ is 3,800 GHz or more (particularly 4,100 or more), and the absolute value of temperature coefficient $\tau_f$ of resonance frequency is 18 ppm/° C. or less (particularly from 6 to 15 ppm/° C.).

(2) When $1.5 \leq a \leq 2.4$, $0.02 \leq b \leq 1.00$, $0.3 \leq c \leq 0.5$, $4.6 \leq d \leq 5.5$ and $0.02 \leq e \leq 0.20$, the dielectric constant $\epsilon_r$ is from 91 to 97, the product of unloaded quality coefficient and resonance frequency $Q_u \times f_o$ is 4,100 or more, and the absolute value of temperature coefficient $\tau_f$ of resonance frequency is 15 ppm/° C. or less, particularly from 6 to 15 ppm/° C.

(3) When $1.8 \leq a \leq 2.4$, $0.03 \leq b \leq 0.6$, $0.3 \leq c \leq 0.5$, $4.6 \leq d \leq 5.4$ and $0.02 \leq e \leq 0.20$, the dielectric constant $\epsilon_r$ is from 91 to 97, the product of unloaded quality coefficient and resonance frequency $Q_u \times f_o$ is 4,100 or more, and the absolute value of temperature coefficient $\tau_f$ of resonance frequency is 15 ppm/° C. or less, particularly from 6 to 15 ppm/° C.

(4) When $1.9 \leq a \leq 2.4$, $0.039 \leq b \leq 0.20$, $0.3 \leq c \leq 0.5$, $4.6 \leq d \leq 5.4$ and $0.05 \leq e \leq 0.20$, the dielectric constant $\epsilon_r$ is from 91 to 97, the product of unloaded quality coefficient and resonance frequency $Q_u \times f_o$ is 4,100 or more, and the absolute value of temperature coefficient $\tau_f$ of resonance frequency is 12 ppm/° C. or less, particularly from 6 to 12 ppm/° C.

(5) When $2.0 \leq a \leq 2.2$, $0.03 \leq b \leq 0.2$, $0.3 \leq c \leq 0.4$, $4.6 \leq d \leq 5.3$ and $0.03 \leq e \leq 0.20$, the dielectric constant $\epsilon_r$ is from 91 to 97, the product of unloaded quality coefficient and resonance frequency $Q_u \times f_o$ is 4,200 or more, and the absolute value of temperature coefficient $\tau_f$ of resonance frequency is 10 ppm/° C. or less, particularly from 6 to 10 ppm/° C.

Figure 2:
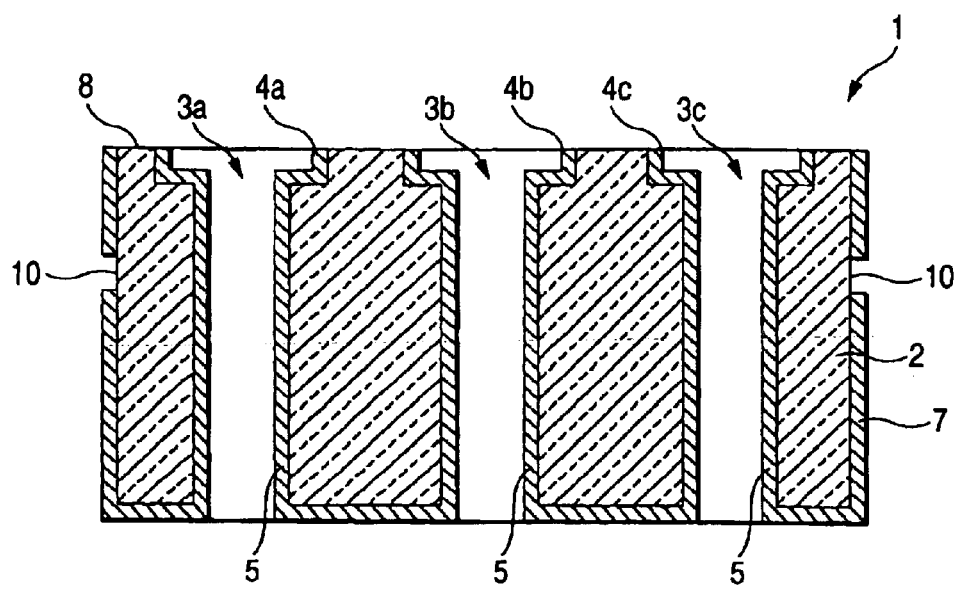
FIG. 2 is a longitudinal cross-section of the dielectric filter 1 shown in FIG. 1.
Figure 3:
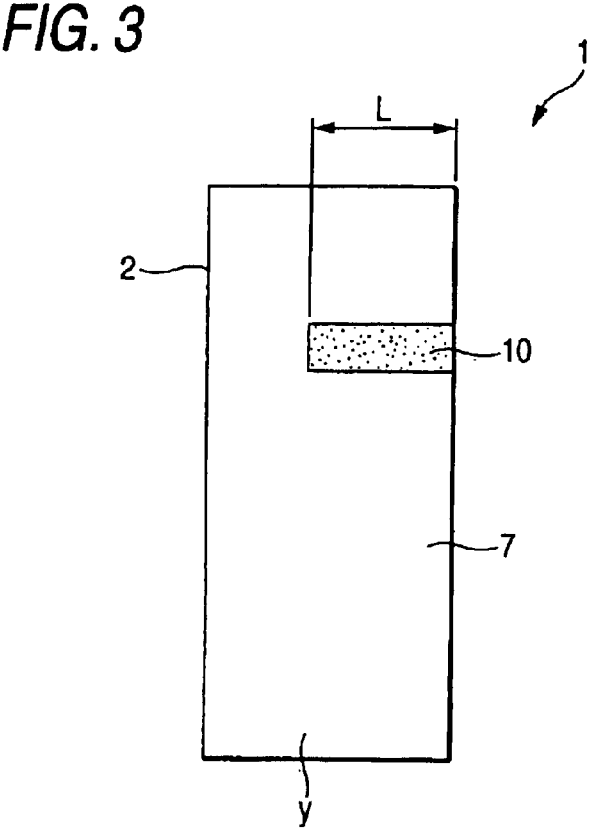
FIG. 3 is a side view of the dielectric filter 1 shown in FIG. 1.
Figure 4:
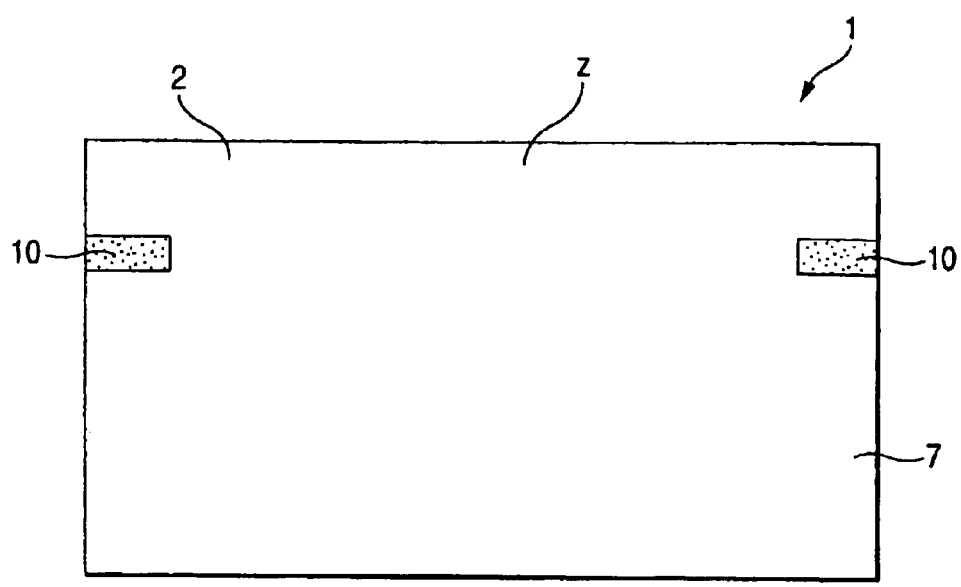
FIG. 4 is a rear view of the dielectric filter 1 shown in FIG. 1.

FIGS. 1 to 4 each shows a three-stage type dielectric filter 1 where three resonators 3a, 3b and 3c are provided in parallel on a single dielectric porcelain block 2.

The dielectric porcelain 2 is composed of a ceramic dielectric material and has an almost rectangular parallelopiped shape. Resonators 3a, 3b and 3c are arranged to lie in parallel to each other and line up along the plane direction. These resonators 3a, 3b and 3c have through holes 4a, 4b and 4c having formed thereon inner conductors 5, 5 and 5, respectively. The predetermined outer peripheral surface excluding the open end face 8 where each through hole 4a, 4b or 4c opens is covered with an outer conductor 7 which works out to a shield electrode. The resonators 3a, 3b and 3c have a resonance length substantially equal to λ/4 of the resonance frequency f.

At the position closer to the open end face 8 on the side surface of the dielectric porcelain block 2, input/output pads 6 and 6 opposing and capacity-coupled with resonators 3a and 3c in the outer side are formed and insulated from the outer electrode 7 with the partition of rectangular boundary regions 9 and 9. These input/output pads 6 and 6 are electrically connected to the conducting path edge on a printed board.

For the sake of convenience, on the side surface of the dielectric porcelain block 2, the surface where the input/output pads 6 and 6 are formed is defined as a pad surface x, the surfaces adjacent to the pad surface x are defined as adjacent side surfaces y and y, and the surface opposing the pad surface x is defined as an opposing surface z.

The main parts of the present invention are described below.

As shown in FIGS. 1 to 4, the dielectric filter 1 of the present invention has a belt-like non-conductive part 10 continuing to the boundary region 9 partitioning the input/output pads 6 and 6 and formed along the direction orthogonal to the through holes 4a, 4b and 4c, on the adjacent side surfaces y and y or on the opposing surface z.

Some examples of the dielectric filter 1 having formed thereon the belt-like non-conductive part 10 are described below.

The side surface where the belt-like non-conductive part 10 is formed may be adjacent side surfaces y and y in both sides or may be an adjacent side surface y only in one side. In each of these structures, the length L of the belt-like non-conductive part 10 may be more increased to form the belt-like non-conductive part 10 even on the opposing surface z (see, FIG. 4). The combination of these practical embodiments is appropriately selected according to the desired frequency f of attenuation pole in the high frequency zone. The outer conductor 7 of the dielectric filter is suitably coated and formed by screen printing and the belt-like non-conductive part 10 is formed by the cutting using a conventionally known grinder or laser.

In the dielectric filter 1 having the above-described structure, three resonators 3a, 3b and 3c having a dielectric constant of 78, an outer dimension of 4.2 mm (length (resonance length))×4.6 mm (width)×2.0 mm (thickness) and a diameter of 0.5 mm are formed at intervals of 1.5 mm on the dielectric porcelain block 2 and a belt-like non-conductive part 10 having a width of 0.5 to 1.0 mm is formed at the position with a spacing of 0.5 to 1.0 mm from the open end face 8.

In the dielectric filter of the present invention, a belt-like non-conductive part continuing to the boundary region partitioning the input/output pad and free of the outer conductor, and extending along the direction orthogonal to the through hole is formed on the dielectric porcelain block side surface having not formed thereon the input/output pad, so that the dielectric filter can be increased in the attenuation amount in the vicinity of passband and a dielectric filter having high precision can be provided.

Also, in the method for adjusting the frequency of an attenuation pole in the high frequency region of a dielectric filter of the present invention, the frequency of an attenuation pole in the high frequency zone can be adjusted by controlling the length of the belt-like non-conductive part, so that the attenuation amount in the vicinity of passband can be increased by increasing the length of the belt-like non-conductive part as much as possible under various conditions and a dielectric filter having high precision can be provided. Furthermore, by this adjusting method, the dielectric filter can be applied to various uses.

EXAMPLES

The present invention is described in greater detail below by referring to Examples.

(1) Production of Dielectric Porcelain Composition

Commercially available powders of $BaCO_3$, $Nd_2O_3$, $Pr_6O_{11}$, $Bi_2O_3$, $TiO_2$, $Na_2CO_3$ and $K_2CO_3$ each was weighed to give the molar composition shown in Table 1 in terms of oxide (Examples 1 to 10 and Comparative Examples 1 to 5). In Table 1, the mark "*" shows that the composition is out of the scope of the present invention. $K_2CO_3$ powder was used in Examples 1 to 8, $Na_2CO_3$ powder was used in Example 9, and $K_2CO_3$ powder and $Na_2CO_3$ powder were used in Example 10.

The powders were wet-mixed with a solvent (ethanol) and the obtained mixed powder was calcined at 1,000° C. for 2 hours in an air atmosphere. Then, a dispersant, a wax-base binder and a solvent (ethanol) were added to the calcined product obtained and these were pulverized in a ball mill to provide a slurry. This slurry was granulated by drying and then molded into a cylindrical form by performing a uniaxial pressing under a pressure of 20 MPa. Thereafter, the molded article was subjected to CIP (cold isotropic hydrostatic pressing) treatment under a pressure of 150 MPa, kept at 1,3000 to 1,400° C. for 2 hours in an air atmosphere, and then sintered to obtain dielectric porcelain compositions of Examples 1 to 10 and Comparative Examples 1 to 5.

TABLE 1

| Sample No. | BaO | $NdO_3$ a | $PrO_{11/6}$ b | $BiO_{3/2}$ c | $TiO_2$ d | $KO_{1/2}$ e | $NaO_{1/2}$ | $\epsilon_r$ | Q•f (GHz) | $\tau_f$ (ppm/° C.) |
|---|---|---|---|---|---|---|---|---|---|---|
| Example 1 | 1 | 1.8 | 0.60 | 0.4 | 5.3 | 0.15 | | 95 | 4158 | 15 |
| Example 2 | 1 | 1.9 | 0.15 | 0.5 | 4.7 | 0.05 | | 95 | 4433 | 12 |
| Example 3 | 1 | 2.0 | 0.10 | 0.3 | 4.9 | 0.10 | | 97 | 4400 | 12 |
| Example 4 | 1 | 2.0 | 0.03 | 0.4 | 4.6 | 0.03 | | 95 | 4436 | 10 |
| Example 5 | 1 | 2.1 | 0.20 | 0.3 | 5.3 | 0.20 | | 91 | 4510 | 6 |
| Example 6 | 1 | 2.2 | 0.20 | 0.4 | 4.6 | 0.10 | | 92 | 4290 | 8 |
| Example 7 | 1 | 2.2 | 0.20 | 0.4 | 5.3 | 0.20 | | 93 | 4158 | 12 |
| Example 8 | 1 | 2.4 | 0.10 | 0.4 | 5.4 | 0.20 | | 97 | 4400 | 12 |
| Example 9 | 1 | 2.2 | 0.20 | 0.4 | 4.6 | | 0.10 | 94 | 4100 | 6 |
| Example 10 | 1 | 2.2 | 0.20 | 0.4 | 4.6 | 0.05 | 0.05 | 93 | 4220 | 6 |
| Comparative Example 1 | 1 | *0.8 | *1.20 | 0.5 | 4.7 | 0.05 | | 93 | 2780 | 20 |
| Comparative Example 2 | 1 | 2.0 | 0.10 | 0.3 | 4.9 | *— | | 97 | 3600 | 12 |
| Comparative Example 3 | 1 | 1.7 | 0.10 | 0.3 | *4.3 | 0.10 | | | non-sintered | |
| Comparative Example 4 | 1 | 1.8 | 0.15 | *0.7 | 4.7 | 0.05 | | 97 | 3000 | 28 |
| Comparative Example 5 | 1 | 2.2 | 0.20 | 0.4 | *5.6 | *0.40 | | 100 | 3300 | 32 |

(2) Measurement of Dielectric Characteristics

The surface of each dielectric porcelain composition obtained was polished and thereafter, the dielectric constant $\epsilon_r$, the unloaded quality coefficient $Q_u$ and the temperature coefficient $\tau_f$ of resonance frequency were measured at a measuring frequency of 2 to 4 GHz by a parallel conductor plate-type dielectric resonator method. The results are shown in Table 1. Here, the temperature range in measuring $\tau_f$ was from 25 to 80° C. $Q_u$ is shown by the product with the resonance frequency $f_o$.

(3) Effect of Examples

When Pr oxide powder and the like was mixed to the Ba—Nd—Bi—Ti—O system so as to improve the dielectric constant (Comparative Example 2), $\epsilon_r$ shows an excellent value of 97 but the $Q_u \times f_o$ value was as low as 3,600 GHz. Furthermore, even when both Pr oxide powder and the like and Ha oxide powder and the like and/or K oxide powder and the like were mixed, if the a, b, c, d and e values were out of respective predetermined ranges (Comparative Examples 1 and 3 to 5), some samples caused sintering failure (Comparative Example 3) and even in the case of samples which did not cause sintering failure (Comparative Examples 1, 4 and 5), the $Q_u \times f_o$ value was 3,300 GHz or less and the absolute value of $\tau_f$ was 20 ppm/° C. or more, despite excellent $\epsilon_r$ value of 93 or more. From these, it is seen that these dielectric porcelain compositions are not good in the performance balance.

On the other hand, when both Pr oxide powder and the like and Na oxide powder and the like and/or K oxide powder and the like were mixed to the Ba—Nd—Bi—Ti—O system to have predetermined a, b, c, d and e values (Examples 1 to 10), $\epsilon_r$ was from 91 to 97, the $Q_u \times f_o$ value was from 4,158 to 4,510 GHz and the absolute value of $\tau_f$ was from 6 to 15 ppm/° C., revealing that these dielectric porcelain compositions have excellent balance of characteristics.

In particular, (1) when $1.9 \leq a \leq 2.4$, $0.03 \leq b \leq 0.20$, $0.3 \leq c \leq 0.5$, $4.6 \leq d \leq 5.4$ and $0.05 \leq e \leq 0.20$ (Examples 2 to 10), $\epsilon_r$ was from 91 to 97, $Q_u \times f_o$ was from 4,158 to 4,510 GHz and the absolute value of $\tau_f$ was from 6 to 12 ppm/° C., and (2) when $2.0 \leq a \leq 2.2$, $0.03 \leq b \leq 0.2$, $0.3 \leq c \leq 0.4$, $4.6 \leq d \leq 5.3$ and $0.03 \leq e \leq 0.20$ (Examples 4 to 6), $\epsilon_r$ was from 91 to 95, $Q_u \times f_o$ was from 4,290 to 4,510 GHz and the absolute value of $\tau_f$ was from 6 to 10 ppm/° C. It is seen that these dielectric porcelain compositions have more excellent balance of characteristics with a larger $Q_u \times f_o$ value and a smaller absolute value of $\tau_f$ while maintaining $\epsilon_r$ in a practically satisfactory range.

The present invention is not limited to those specifically described in Examples above but various modifications can be made according to the purpose or use within the scope of the present invention.

In Examples, $BaCO_3$, $Nd_2O_3$, $Pr_6O_{11}$, $Bi_2O_3$, $TiO_2$, $Na_2CO_3$ and $K_2CO_3$ powders were used as the raw material metal oxide powder and the like, however, the same effect can also be obtained by using a combination of compound powders other than these kinds of compound powders, for example, (1) all oxide powders, (2) all carbonate powders or (3) a combination of oxide powder and carbonate powder other than the combinations of Examples.

Furthermore, in Examples, either one of Na oxide and the like and K oxide and the like is used, however, these two oxides may be mixed within a predetermined range. Also, other components, unavoidable impurities and the like may be contained in the dielectric material of the present invention within the range of not substantially affecting the dielectric characteristics.

The dielectric porcelain composition of the present invention is large in the $\epsilon_r$ value and the $Q_u$ value, small in the absolute value of $\tau_f$ and very excellent in the balance of these dielectric characteristics. Accordingly, the dielectric porcelain composition of the present invention can be suitably used as a resonator, a filter, a multilayer circuit board, an impedance matching member of various microwave circuits, and the like.

This application is based on Japanese Patent application JP 2001-346448, filed Nov. 12, 2001, the entire contents of which is hereby incorporated by reference, the same as if set forth at length.

What is claimed is:

1. A dielectric porcelain composition comprising Ba, Nd, Pr, Bi, Ti and at least one of Na and K and satisfying a condition that when the composition is expressed by composition formula: $BaO—aNdO_{3/2}—bPrO_{11/6}—cBiO_{3/2}—dTiO_2—eAO_{1/2}$, wherein A is at least one of Na and X, and a, b, c, d and e represent a molar ratio, a, b, c, d and e are in respective ranges of $1.5 \leq a \leq 2.6$, $0.02 \leq b \leq 1.00$, $0.2 \leq c \leq 0.6$, $4.5 \leq d \leq 5.5$ and $0.02 \leq e \leq 0.30$.

2. The dielectric porcelain composition according to claim 1, wherein the a, c, d and e are in respective ranges of $1.5 \leq a \leq 2.4$, $0.3 \leq c \leq 0.5$, $4.6 \leq d \leq 5.5$ and $0.02 \leq e \leq 0.20$.

3. A dielectric porcelain composition obtained by blending at least one of: metal oxide powders of Ba, Nd, Pr, Bi, Ti and at least one of Na and K; and metal compounds capable of converting into the respective metal oxides by heating, to satisfy a condition that when the composition is expressed by composition formula: $BaO—aNdO_{3/2}—bPrO_{11/6}—cBiO_{3/2}—dTiO_2—eAO_{1/2}$, wherein A is at least one of Na and K, molar ratio of the respective metal elements in terms of oxide is $1.5 \leq a \leq 2.6$, $0.02 \leq b \leq 1.00$, $0.2 \leq c \leq 0.6$, $4.5 \leq d \leq 5.5$ and $0.02 \leq e \leq 0.30$, and burning the blend.

4. The dielectric porcelain composition according to claim 3, wherein the a, c, e and e are in respective ranges of $1.5 \leq a \leq 2.4$, $0.3 \leq c \leq 0.5$, $4.6 \leq d \leq 5.5$ and $0.02 \leq e \leq 0.20$.

5. A dielectric filter comprising:

a dielectric porcelain block;

a plurality of resonators provided in parallel to each other on the dielectric porcelain block, each of the resonators comprising a through hole and an inner conductor provided on an inner peripheral surface of the through hole; and an outer conductor provided on a predetermined outer peripheral surface of the dielectric porcelain block excluding an open end face where the through holes open;

wherein the dielectric porcelain composition according to claim 1 is used in the dielectric filter.

6. The dielectric filter according to claim 5, wherein the a, c, d and e are in respective ranges of $1.5 \leq a \leq 2.4$, $0.3 \leq c \leq 0.5$, $4.6 \leq d \leq 5.5$ and $0.02 \leq e \leq 0.20$.

7. A dielectric filter comprising:

a dielectric porcelain block;

a plurality of resonators provided in parallel to each other on the dielectric porcelain block, each of the resonators comprising a through hole and an inner conductor provided on an inner peripheral surface of the through hole; and an outer conductor provided on a predetermined outer peripheral surface of the dielectric porcelain block excluding an open end face where the through holes open;

wherein the dielectric porcelain composition according to claim 3 is used in the dielectric filter.

8. The dielectric filter according to claim 7, wherein the a, c, e and e are in respective ranges of $1.5 \leq a \leq 2.4$, $0.3 \leq c \leq 0.5$, $4.6 \leq d \leq 5.5$ and $0.02 \leq e \leq 0.20$.

* * * * *